(12) United States Patent
Deng et al.

(10) Patent No.: US 8,666,058 B2
(45) Date of Patent: Mar. 4, 2014

(54) TIME DOMAIN ADAPTIVE FILTER BANK FOR NETWORK ECHO REDUCTION OR CANCELLATION

(75) Inventors: Hongyang Deng, Austin, TX (US); Roman A. Dyba, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 867 days.

(21) Appl. No.: 12/558,201

(22) Filed: Sep. 11, 2009

(65) Prior Publication Data

US 2011/0064213 A1 Mar. 17, 2011

(51) Int. Cl.
 *H04M 9/08* (2006.01)
(52) U.S. Cl.
 USPC .................................................. 379/406.08
(58) Field of Classification Search
 USPC .................................................. 379/406.08
 See application file for complete search history.

(56) References Cited

U.S. PATENT DOCUMENTS 6,580,696 B1 * 6/2003 Chen et al. .................... 370/286

* cited by examiner

*Primary Examiner* — Alexander Jamal
(74) *Attorney, Agent, or Firm* — Yudell Isidore Ng Russell PLLC

(57) ABSTRACT

In one or more embodiments, an echo reduction system can include multiple adaptive filters operable to provide estimated echo replicas based on received signal information coupled to respective multiple adders that can combine a send signal and outputs of the respective adaptive filters and can provide respective output combinations to a filter selector. The filter selector can select from the outputs of the adders and provide a selected output as output for the echo reduction system. In one or more embodiments, the filter selector can control signal processing of the filters by providing control signal to the adaptive filters, where the control signals can indicate to ones of the adaptive filters to pause or continue signal processing. In one or more embodiments, the echo reduction system can include at least one delay unit that can delay receive signal information to at least one of the adaptive filters.

21 Claims, 9 Drawing Sheets

TIME DOMAIN ADAPTIVE FILTER BANK FOR NETWORK ECHO REDUCTION OR CANCELLATION

BACKGROUND

1. Technical Field

This disclosure relates generally to communication systems and equipment, and more specifically, to techniques, methods, processes and apparatus for echo cancellation or echo reduction in a communication system.

2. Description of the Related Art

Echo has a major effect on voice quality in communication networks (such as a Public Switching Telephone Network (PSTN), a Packet Telephony (PT) network, etc.). The objectionable effect of echo results from a combination of reflections from network components such as two- to four-wire converters (e.g., an impedance mismatch of a hybrid circuit, which is a device used to convert signals from a four-wire communication network interface to a two-wire local subscriber loop, and vice versa), together with signal processing and transmission delay. Echo may cause users difficulty in talking or listening over a telephone connection, and it may also affect the transmission of voiceband data, fax and text.

Echo cancellation is used in a telecommunications network to ensure voice quality through elimination or reduction of electric or line echo from the telecommunications network. Echoes develop, or are created, in an "echo path," which is a circuit that includes transmission facilities and equipment (including the hybrid and terminating telephone set) connected to the near end of an echo canceller.

An echo canceller is a device that reduces or eliminates echoes to allow successful transmission of voice and/or voiceband data (such as modem and facsimile signals). Echo cancellers can be placed in the four-wire portion of a circuit, and reduce (or cancel) the echo by subtracting an estimate of the echo from the returned echo signal. For a more detailed discussion of echo cancellers, see the document entitled "Digital Network Echo Cancellers," which is published by The International Telecommunication Union's (ITU) Telecommunication Standardization Sector (ITU-T) as ITU-T Recommendation G.168.

One characteristic of a good echo canceller is rapid convergence. Convergence can be generally defined as the time the echo canceller needs to produce an estimate of an echo signal and reduce the echo signal below a threshold. Adaptive signal processing devices may be used in an echo canceller to remove or facilitate removal of the echo signal. The adaptive signal processing circuits unfortunately may increase the complexity and computational costs associated with rapid and accurate echo signal identification and cancellation or removal.

BRIEF DESCRIPTION OF THE DRAWINGS

The present disclosure is illustrated by way of example and is not limited by the accompanying figures. Elements in the figures are illustrated for simplicity and clarity and have not necessarily been drawn to scale.

DETAILED DESCRIPTION

Figure 1:
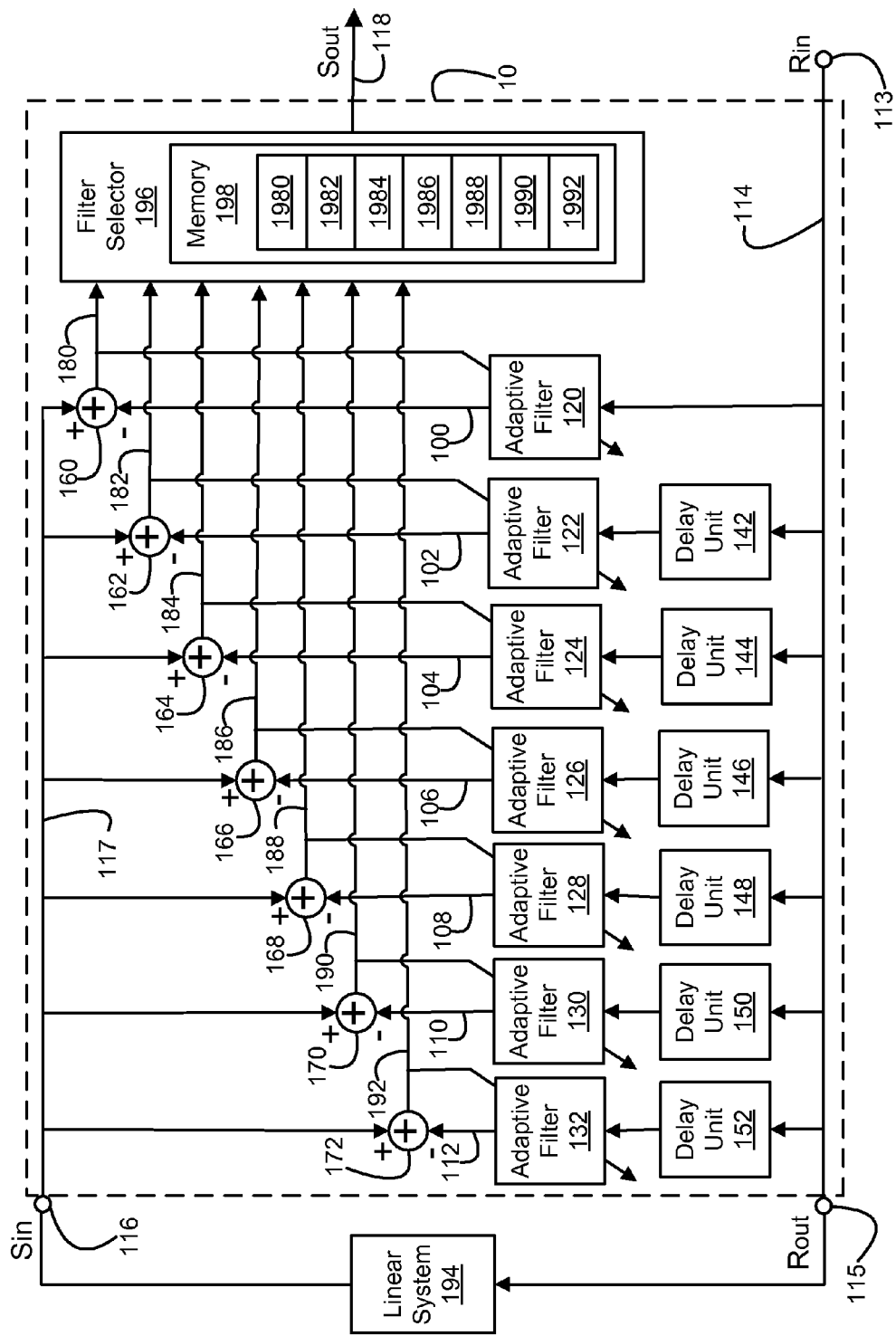
FIG. 1 provides a block diagram of an echo reduction processing system, according to one or more embodiments.

FIG. 1 depicts a block diagram of portions of a system for reducing or canceling echo signals, according to one or more embodiments. It is noted that many of the processes and functional blocks described herein operate in a digital domain or a time domain using data (e.g., digital data, analog data, etc.) representing speech and/or other data transmitted over a communication network. In one or more embodiments, echo reduction system (ERS) 10 (which can also be referred to as an echo canceller) can reduce or eliminate one or more echo signals. In one or more embodiments, ERS 10 can be implemented with a processor executing instructions executing from a memory, programmable hardware, an ASIC (application specific integrated circuit), a FPGA (field programmable gate array), and/or one or more integrated circuits, among others. An echo signal can be an undesired, delayed copy of $R_{out}$ signal. In one example, the delayed copy can be delayed by about 20-30 milliseconds, which is a range for which humans begin to recognize the delayed signal as an echo. In a second example, the echo delay can be more, even extending to hundreds of milliseconds (e.g., intercontinental calls, satellite communications, packet-switched communications, voice over Internet protocol (VoIP) communications, cellular telephony communications, etc.). In another example, the echo delay can be a modified delayed copy of receive signal 114. Receive signal 114, which can also be coupled to linear system 194 (e.g., the signal that may be referred to as "$R_{out}$" 115; note that in many of practical implementations of echo cancellers $R_{out}=R_{in}$; however, the ITU-T G.168 Recommendation maintains a level of abstraction and makes a distinction between these two signals), can be a signal received via a network, such as the Public Switched Telephone Network (PSTN), Packet Telephony (PT) network, etc. Receive signal 114 may also be referred to as a "far end signal". Send signal 117 can also be referred to as a "cancelled end signal". In one or more embodiments, an "echo path" is defined as the signal path (or transmission path) of the echo, which is the transmission path between $R_{out}$ 115 and $S_{in}$ 116 of ERS 10, or alternatively stated, the transmission path between the linear system input and the linear system output. In one or more embodiments, send signal 117, which can be received at an input 116 referred to as "$S_{in}$", can be an output of linear system 194 coupled to ERS 10. Send signal 117 can include a signal produced by a local user or other near end system, among others, together with an echo signal.

In one or more embodiments, linear system 194 includes one or more network elements (e.g., one or more network elements that can convert a four-wire connection to a two-wire connection, which are typically called a hybrid or a hybrid circuit, and other one or more network elements that contribute to a "pure delay" of the input and output signals). In one example, an echo signal is typically caused by an impedance mismatch between network elements, which includes impedance mismatches between electrical cables connecting the hybrid circuits and other network elements, impedance mismatches in cables connecting the voice terminals or telephones sets, and mismatches with the input impedance of voice terminals. For instance, an impedance mismatch can cause one or more signal reflections that can result in one or more echoes. In a second example, an echo signal can be caused by, or changed by, electro-acoustical coupling between speakers and microphones in voice terminals (e.g., telephone sets). In one instance, an electrical and/or acoustic echo can be generated from insufficient electrical and/or acoustic isolation between an earpiece and a microphone in a small handset. In another instance, an acoustic echo can be generated when acoustic waves are reflected against a wall close to a communications device (e.g., a speaker telephone, a hands free device, etc.) or are transmitted from the speaker to the microphone through an enclosure of the communications device at the "far end". In one or more instances, acoustic echo isolation can be problematic when a user wireless of a wireless communications device on the "far end" is experiencing trouble hearing in a noisy environment and increases the earpiece volume to or near a maximum acoustic ear piece volume, and the user could position the communications device n such a way that causes poor acoustic isolation between the earpiece and the microphone resulting in one or more echoes introduced at the "far end". In another example, echoes can be caused or changed by adding a bridged line and/or performing call forwarding in a call-in-progress scenario.

In one or more embodiments, each adaptive filter of adaptive filters 120-132 can estimate a waveform of an echo signal by adapting a set of filter parameters. In one or more embodiments, filter parameters can include filter coefficients (e.g., a vector of factors, which usually include real numbers) of the adaptive filter (e.g., adaptive filter 122), and the adaptive filter can use a tapped-delay-line finite impulse response (FIR) filter and a reference-matching quality assessment block (e.g., adder 162 and error signal 182). As the adaptive filter (e.g., adaptive filter 122) is adapted using an error signal (e.g., error signal 182), coefficients of the adaptive filter are changed so that an estimated echo replica (e.g., estimated echo replica 102) converges to the echo signal in send signal 117. These coefficients adapt to describe an impulse response of the adaptive filter, which impulse response should adapt to, or converge to, the impulse response of linear system 194 according to a given adaptation process or method of choice. The convergence time can be defined as an interval of time between an instant a receive signal 114 is applied to $R_{in}$ port 113 of ERS 10 with the estimated echo path impulse response (e.g., the filter coefficients) initially set to zero, and an instant a returned echo level in an error signal (e.g., error signal 182) reaches a defined level. The defined level need not be constant. For example, the defined level can be a function of the echo return loss (ERL) or other measurements of linear system 194. In one or more embodiments, these adaptive changes can be implemented with a normalized least mean squares (NLMS) process. For example, the NLMS can be computationally efficient and/or can have a relatively low cost in terms of a number of additions and multiplications for relatively good convergence properties, according to some metric(s).

In one or more embodiments, filter selector 196 can select one or more error signals 180-192 and provide output from a selected adder or error signal as an output ($S_{out}$ 118) of ERS 10. In one or more embodiments, ERS 10 can remove or reduce one or more echo signals included in send signal 117 by producing multiple estimated echo replicas using adaptive filters 120-132, adding an inversion of each of the multiple estimated echo replicas to send signal 117 to produce multiple error signals 180-192 for filter selector 196, select an error signal using a selection process, and output an error signal $S_{out}$ 118 that corresponds to one of the produced multiple error signals 180-192. In one or more embodiments, filter selector 196 can perform a selection process (at a sample rate or a decimated rate, among others) using multiple error signals 180-192 as input and produce $S_{out}$ 118.

In one or more embodiments, a selection process can include filter selector 196 calculating one or more error magnitudes of one or more of error signals 180-192 and storing each of the one or more error magnitudes in a memory. In one or more embodiments, an error signal magnitude can include an absolute value of an error signal. As illustrated, filter selector 196 can include a memory 198. In one example, filter selector 196 can calculate one or more error magnitudes of one or more of error signals 180-192 and store each of the one or more error magnitudes in memory 198. For instance, error magnitudes corresponding to error signals 180-192 can be stored in respective memory locations 1980-1992.

Figure 4:
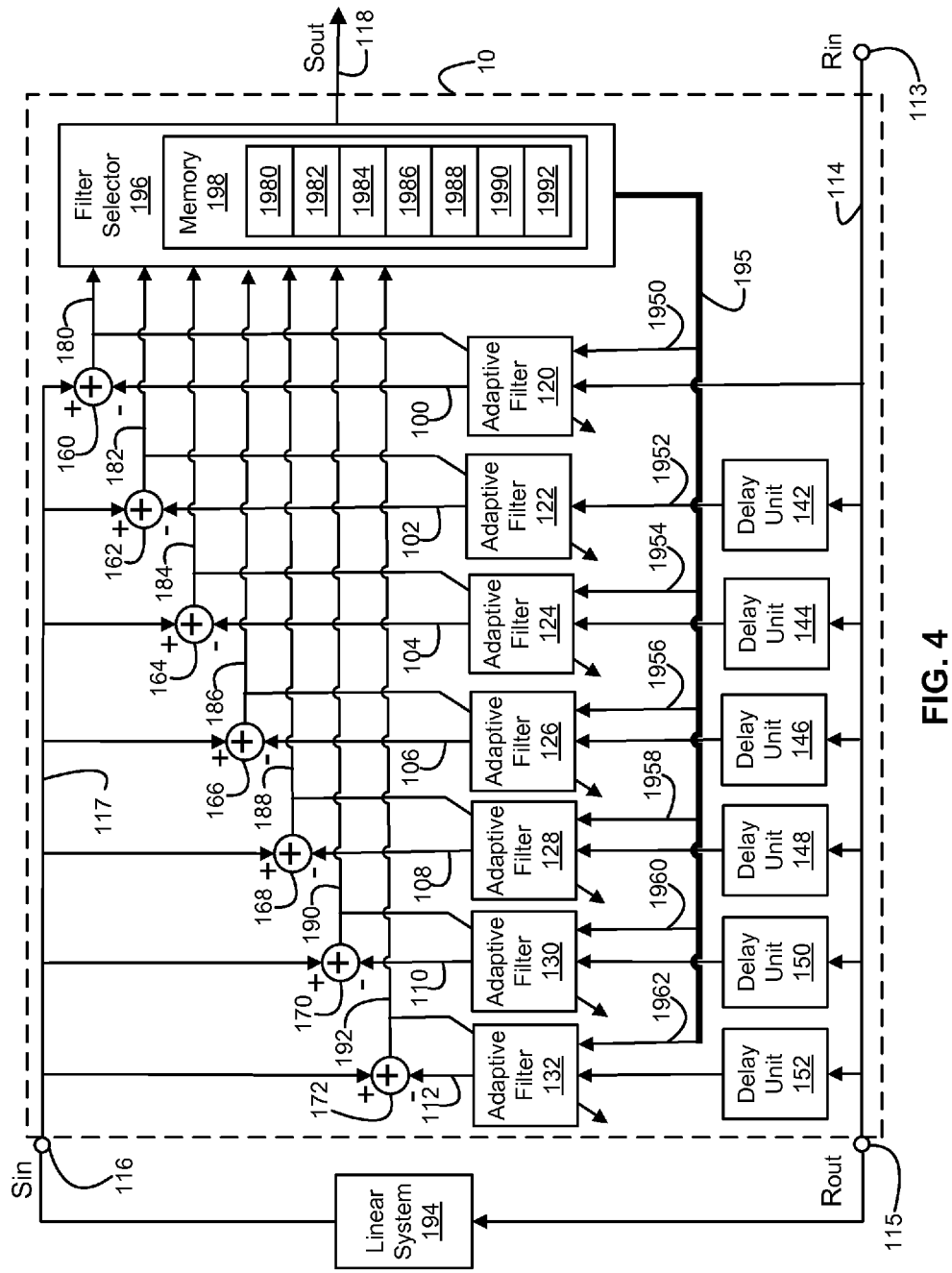
FIG. 4 provides a block diagram of an echo reduction processing system including adaptive filters operable of being paused, according to one or more embodiments.
Figure 7:
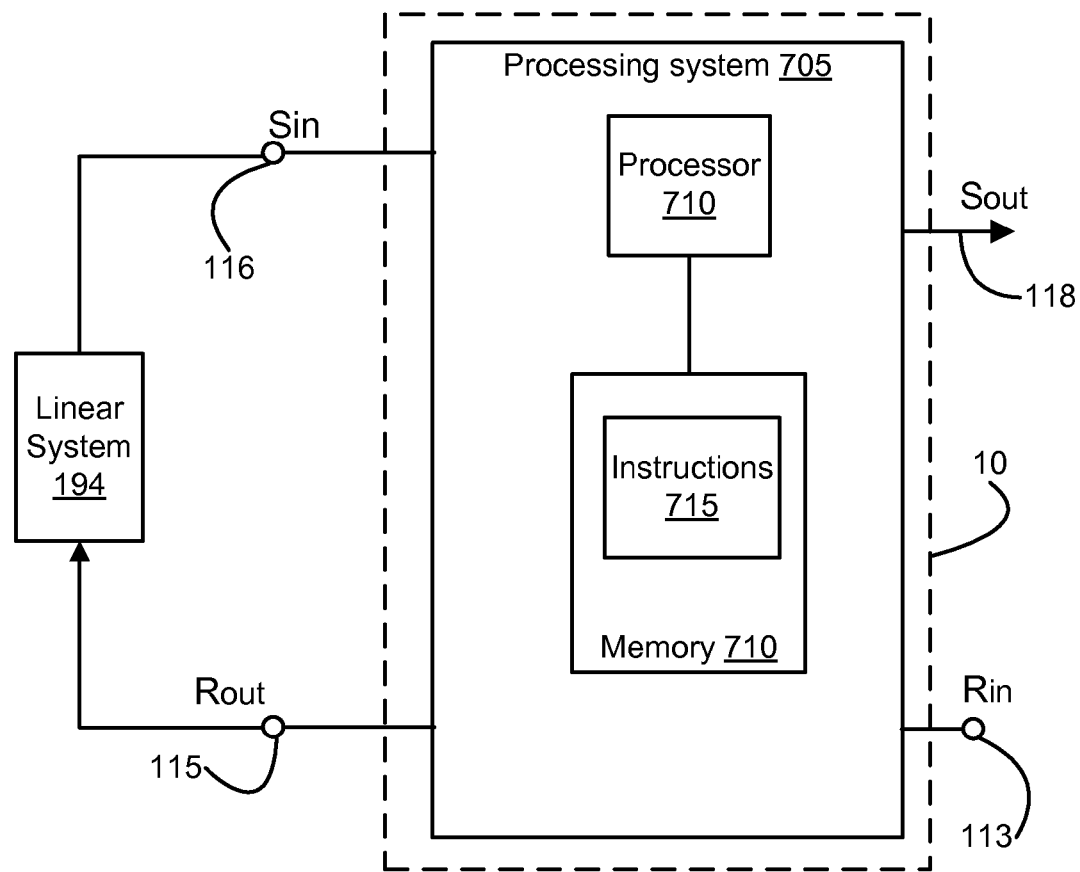
FIG. 7 provides a block diagram of an echo reduction processing system including a processor operable to implement one or more structures and/one or more methods, according to one or more embodiments.

As shown ERS 10 can include multiple adaptive filters 120-132 that can be coupled to a receive signal 114 (which is represented schematically at signal path 114, as are other "signals" similarly referred to herein with reference to FIGS. 1, 4, and 7), which also may be known as a "$R_{in}$" signal, as used in ITU-T Recommendation G.168, and other similar documents. As illustrated, ERS 10 can include delay units 142-152 that can be coupled to receive signal 114, and adaptive filters 122-132 can be coupled to receive signal 114 through respective delay units 142-152. In one or more embodiments, each of adaptive filters 120-132 can process signal information over a period of time. For example, the period of time may include thirty-two milliseconds (ms).

In one or more embodiments, each delay unit output of delay units 142-152 can provide a respective delay of signal 114 to a respective adaptive filter. In this fashion, each of adaptive filters 122-132 can process a respective portion, with respect to time, of signal 114. For example, delay units 142-152 can delay signal 114 by sixteen (16) ms, thirty-two (32) ms, forty-eight (48) ms, sixty-four (64) ms, eighty (80) ms, and ninety-six (96) ms, respectively to respective adaptive filters 122-132, and adaptive filter 120 can receive signal 114 without delay. In this example, each of adaptive filters 120-132 can process a respective portion of signal 114 that overlaps, in time, with one or more adjacent adaptive filters. In one or more embodiments, using multiple adaptive filters in parallel, with each adaptive filter processing a portion of an input signal that overlaps one or more portions of the input signal processed by one or more adjacent adaptive filters, can cover one or more possibilities of "pure delay". Using multiple adaptive filters in parallel, with each adaptive filter processing a portion of an input signal that overlaps one or more portions of the input signal processed by one or more adjacent adaptive filters is described further below with reference to FIG. 2.

In one or more embodiments, "pure delay" can be defined as a delay of time of signal propagation from a $R_{out}$ port 115 to a $S_{in}$ port 116. For example, the delay of time of signal propagation can be caused by one or more delays inherent in one or more near-end echo path transmission facilities (e.g., a linear system 194 which can be coupled to ERS 10), not including dispersion time due to network elements. For example, an echo signal may not be a single reflection of an original signal but can be a consecutive reflection over a period of time. For instance, an echo can have a certain duration, or dispersion time, which can be a period of time during which the echo reflection occurs. For example, a hybrid echo (e.g., electrically generated echo) can have a typical dispersion of less than ten (10) ms. However, since an acoustic echo can be generated by reflections from a communications device and/or an environment on the "far end", an acoustic echo is more dispersive. For instance, one or more acoustic echoes can have dispersion times of up to one hundred (100) ms.

In this fashion, a pure delay or a pure delay estimation may not be necessarily be determined for $S_{out}$ 118 to converge within a short amount of time, according to some metric, since the pure delay can be covered by the respective portions of time covered by adaptive filters 120-132. When the convergence time is short, communications system users may initially hear an echo, but a system using and/or including ERS 10 can quickly, according to some metric, adapt as ERS 10 converges and removes more and more of the echo signal.

In one or more embodiments, by using multiple adaptive filters in parallel, with each adaptive filter processing a portion of an input signal, $S_{out}$ 118 (output of ERS 10) can converge to an output signal with reduced or eliminated echoes in a shorter amount of time transpiring compared to using a single adaptive filter and an echo delay estimator which can delay input samples of the single adaptive filter. In one or more embodiments, a short convergence time can be important to an overall quality (e.g., voice quality) of ERS 10 and, specifically, to consumers (e.g., users, circuits, devices, etc.) of $S_{out}$ 118. In one or more embodiments, a convergence time can be defined as an interval between an instant receive signal 114 is applied to $R_{in}$ port 113 of ERS 10 with an estimated echo path impulse response initially set to zero, and the instant the returned echo level in error signal $S_{out}$ 118 reaches a defined level. The defined level need not be constant. For example, the defined level can be a function of the ERL or other measurements of linear system 194.

In one or more embodiments, each of delay units 142-152 can include a buffer (e.g., a memory buffer, such as a first-in-first-out (FIFO) memory), where samples (e.g., digital samples) can be stored, recalled, and output after a delay time or after an amount of time transpiring. For example, delay unit 142 can receive information from signal 114, store the information from signal 114, and provide the information from signal 114 to adaptive filter 122 after an amount of time transpiring.

In one or more embodiments, adaptive filters 120-132 can provide a respective estimated echo replica or estimated echo to a respective inverting input of respective adders 160-172. As shown, outputs of adaptive filters 120-132 can provide respective estimated echo replicas or estimated echoes 100-112 to respective inverting inputs of respective adders 160-172. As illustrated, send signal 117 can be provided to respective non-inverting inputs of adders 160-172. In one or more embodiments, each adder of adders 160-172 can combine the inverting input and the non-inverting input and produce an error signal through the output of the adder. In one or more embodiments, ERS 10 can include a filter selector 196, and adders 160-172 can be coupled to provide respective outputs or error signals 180-192 to filter selector 196. In one or more embodiments, error signals 180-192 can provide feedback to respective adaptive filters 120-132.

Figure 2:
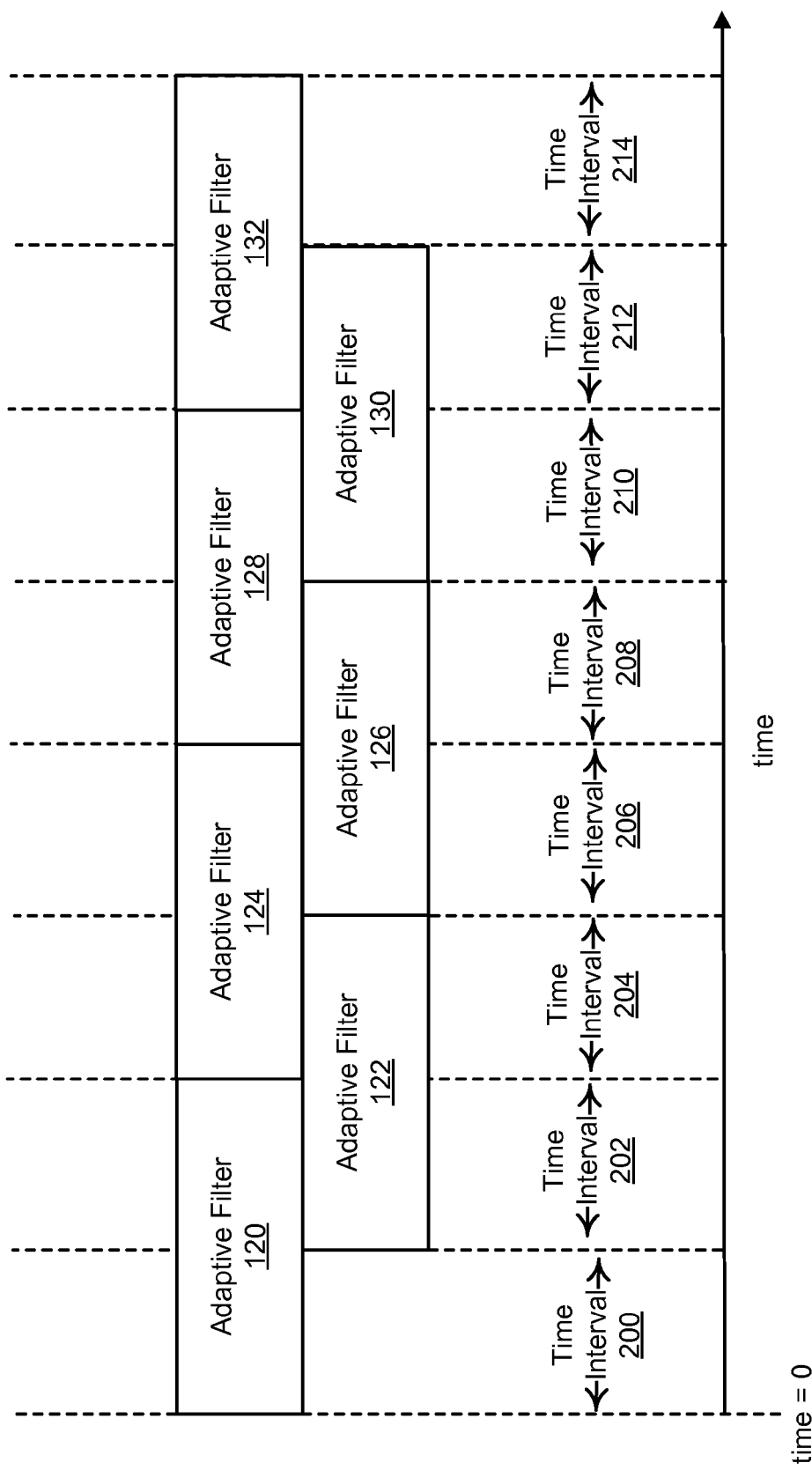
FIG. 2 provides an exemplary diagram of adaptive filters covering a time period, according to one or more embodiments.

Turning now to FIG. 2, an exemplary diagram is illustrated that shows multiple adaptive filters overlapping multiple time intervals, according to one or more embodiments. As shown, adaptive filter 120 can process receive signal 114 for a period covering time intervals 200-202 (a first dispersion time); adaptive filter 122 can process receive signal 114 for a period covering time intervals 202-204 (a second dispersion time); adaptive filter 124 can process receive signal 114 for a period covering time intervals 204-206 (a third dispersion time); adaptive filter 126 can process receive signal 114 for a period covering time intervals 206-208 (a fourth dispersion time); adaptive filter 128 can process receive signal 114 for a period covering time intervals 208-210 (a fifth dispersion time); adaptive filter 130 can process receive signal 114 for a period covering time intervals 210-212 (a sixth dispersion time); and adaptive filter 132 can process receive signal 114 for a period covering time intervals 212-214 (a seventh dispersion time). In one or more embodiments, each of time intervals 200-214 can correspond to a same time interval. For example, the same time interval can include sixteen (16) ms. In one or more embodiments, one or more of time intervals 200-214 can include a time interval that is different from another time interval.

In one or more embodiments, delay units 142-152 can delay signal 114 by a time period of time interval 200, a time period of a sum of time intervals 200-202, a time period of a sum of time intervals 200-204, a time period of a sum of time intervals 200-206, a time period of a sum of time intervals 200-208, and a time period of a sum of time intervals 200-210, respectively. In this fashion, each of adaptive filters 120-132 can process receive signal 114 for its time period coverage described above.

As illustrated, each of adaptive filters 120-132 can process receive signal 114 over a period of time that can overlap one or more adjacent adaptive filters. In one example, adaptive filter 120 can process receive signal 114 over a period of time that can overlap adjacent adaptive filter 122. In a second example, adaptive filter 122 can process receive signal 114 over a period of time that can overlap adjacent adaptive filters 120 and 124. In another example, adaptive filter 128 can process receive signal 114 over a period of time that can overlap adjacent adaptive filters 126 and 130.

Figure 3:
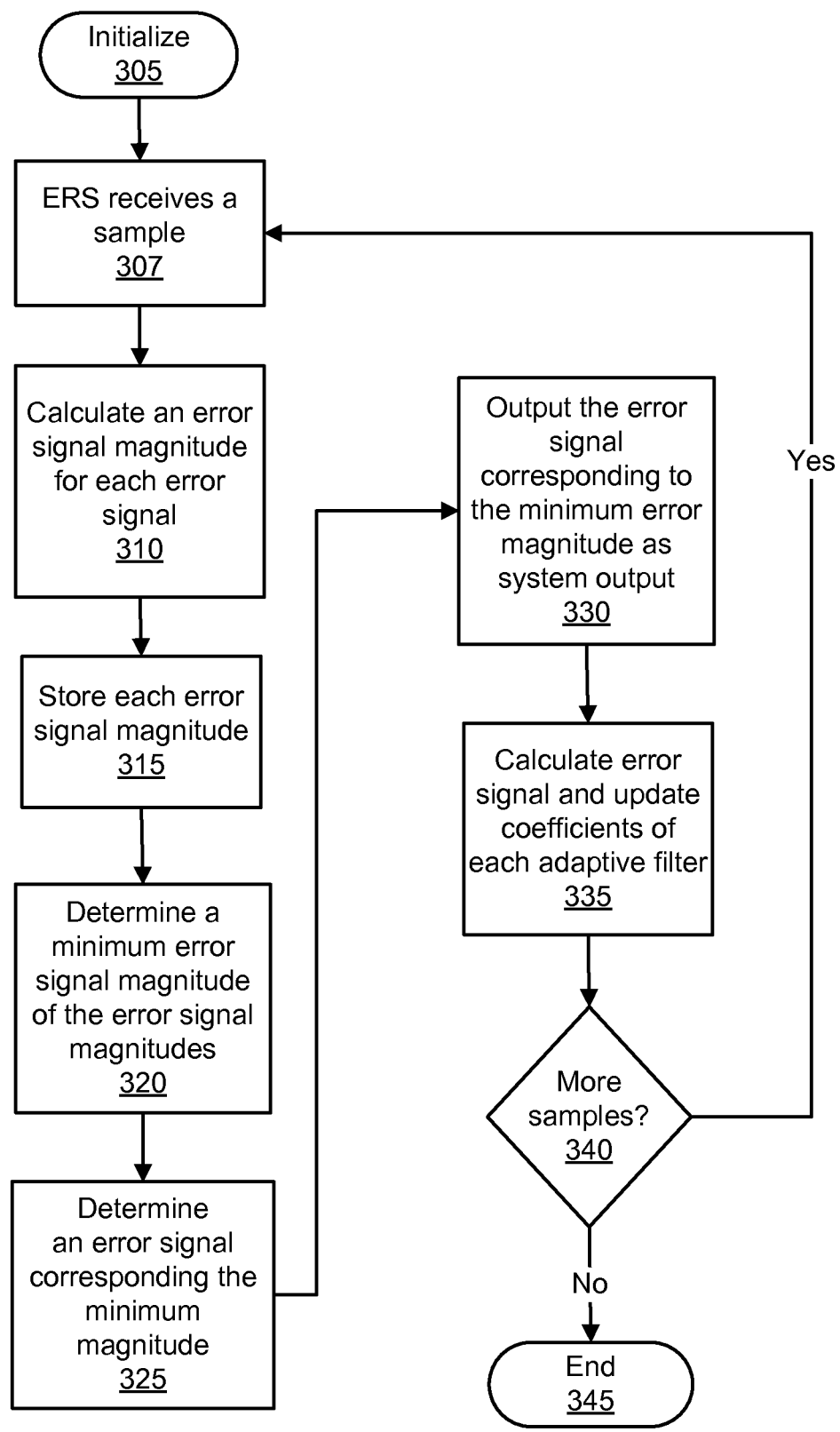
FIG. 3 provides a flowchart diagram of a method, according to one or more embodiments.

Turning now to FIG. 3, a method of reducing or cancelling one or more echoes is illustrated, according to various embodiments. At 305, ERS 10 can be initialized. For example, one or more coefficients of each of adaptive filters 120-132 can be initialized. For instance, the one or more coefficients of each of adaptive filters 120-132 can be initialized to zero. At 307, ERS 10 can receive a sample through $R_{in}$ port 113. In one or more embodiments, the sample can be provided to adaptive filter 120 and delay units 142-152 through receive signal 114. At 310, error magnitudes of each of error signals 180-192 can be calculated. For example, filter selector 196 can calculate each error magnitude of each of error signals 180-192. At 315, error magnitudes of respective error signals 180-192 can be stored. For example, filter selector 196 can store error magnitudes of respective error signals 180-192 in respective memory locations 1980-1992 of memory 196. In one or more embodiments, error magnitudes of respective error signals 180-192 can be stored in a vector or array in a memory. At 320, a minimum error magnitude of the error magnitudes can be determined. For example, filter selector 196 can determine a minimum error magnitude from the error magnitudes stored in memory locations 1980-1992.

At 325, an error signal corresponding to the minimum error magnitude can be determined. For example, filter selector 196 can determine the error signal corresponding to the minimum error magnitude. In one or more embodiments, filter selector 196 can determine the error signal corresponding to the minimum error magnitude based on a memory location of the minimum error magnitude. For example, the error magnitudes stored in memory locations 1980-1992 can correspond to error signals 180-192, and by using the memory location or index, a corresponding error signal can be determined. At 330, the error signal corresponding to the minimum error magnitude can be output. For example, filter selector 196 can output the error signal, corresponding to the minimum error magnitude, as $S_{out}$ 118 (output of ERS 10).

At 335, an error signal can be calculated and coefficients can be updated of each of adaptive filters 120-132. For example, each of adaptive filters 120-132 can be adapted, and coefficients of each of adaptive filters 120-132 are updated so that a respective estimated echo replica (e.g., adaptive filters 120-132 correspond to respective estimated echo replicas 100-112) converges with the echo signal in send signal 117. In one or more embodiments, each adaptive filter of adaptive filters 120-132 can execute and/or implement a NLMS process to update the coefficients of the adaptive filter. At 340, a determination of whether or not additional samples are to be processed. If additional samples are to be processed, the method can proceed to 310. If no additional samples are to be processed, the method can conclude at 345.

Turning now to FIG. 4, a block diagram of portions of a system for reducing or canceling echo signals is illustrated, according to one or more embodiments. As shown, ERS 10 can include elements with reference to FIG. 1 and described above. As illustrated, filter selector 196 can be coupled to adaptive filters 120-132 through respective signal paths 1950-1962 and signal path or bus 195. In one or more embodiments, signal path or bus 195 can include signal paths 1950-1962. In one or more embodiments, filter selector 196 can provide one or more signals to adaptive filters 120-132. For example, filter selector 196 can provide one or more control signals to adaptive filters 120-132 that can be used to individually control each adaptive filter. For instance, filter selector 196 can send a control signal to adaptive filter 130 over bus 195, and adaptive filter 130 can receive the control signal and perform accordingly, based on the control signal.

In one or more embodiments, one or more of adaptive filters can pause or continue one or more signal processing processes, e.g., an adaptive process and/or pause or continue a filtering process, etc. In one example, adaptive filter 130 can receive a control signal over bus 195 and, based on the control signal, pause an adaptive process and/or pause a filtering process. In another example, adaptive filter 130 can receive a control signal over bus 195 and, based on the control signal, continue an adaptive process (e.g., updating coefficients) and/or continue a filtering process. In one or more embodiments, pausing one or more processes of one or more adaptive filters 120-132 can decrease a number of processor cycles used by ERS 10. In one or more embodiments, decreasing a number of processor cycles used by ERS 10 can decrease power consumed by ERS 10.

Figure 5A:
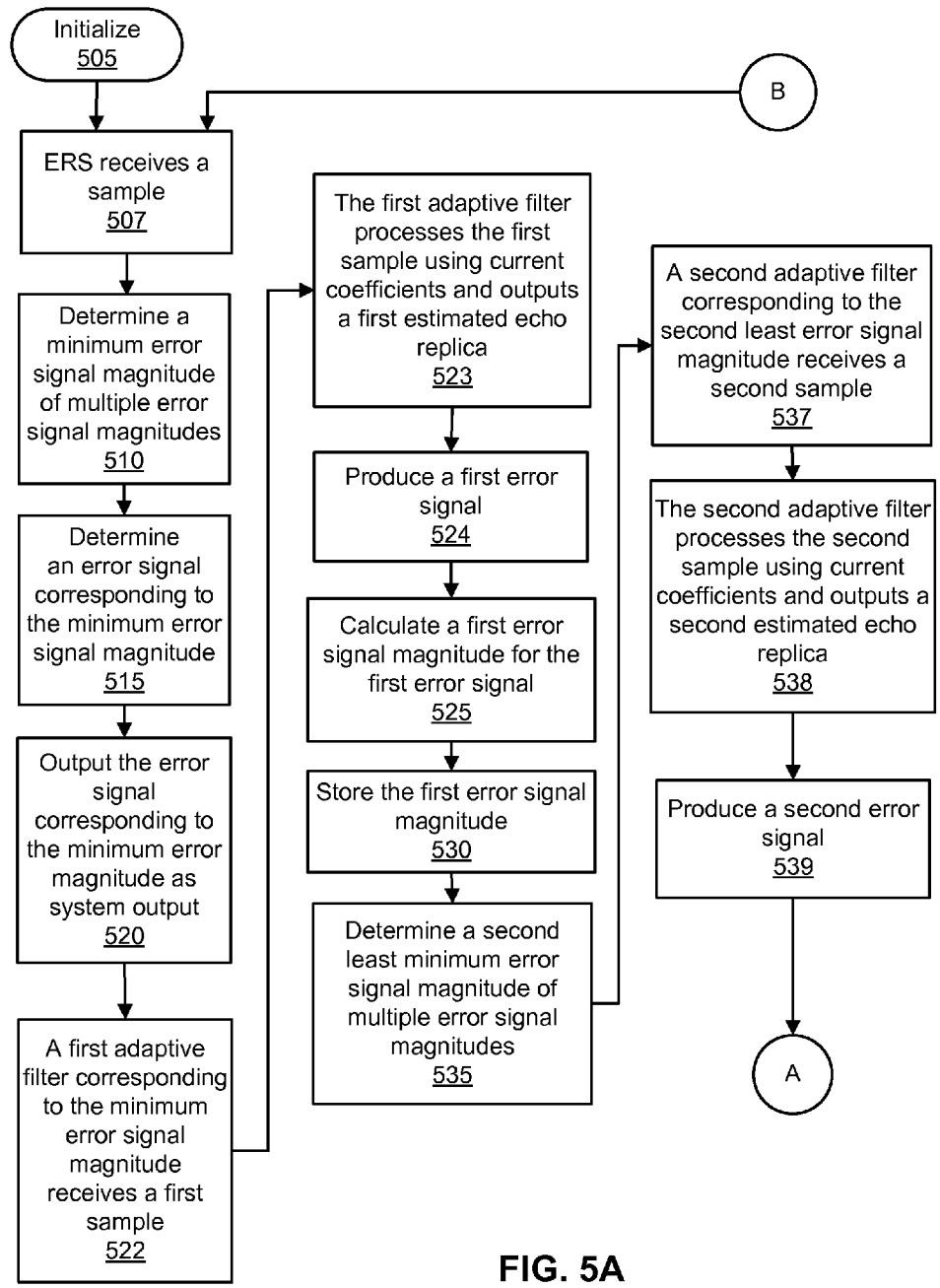
FIGS. 5A and 5B provide a flowchart diagram of a method, according to one or more embodiments.
Figure 5B:
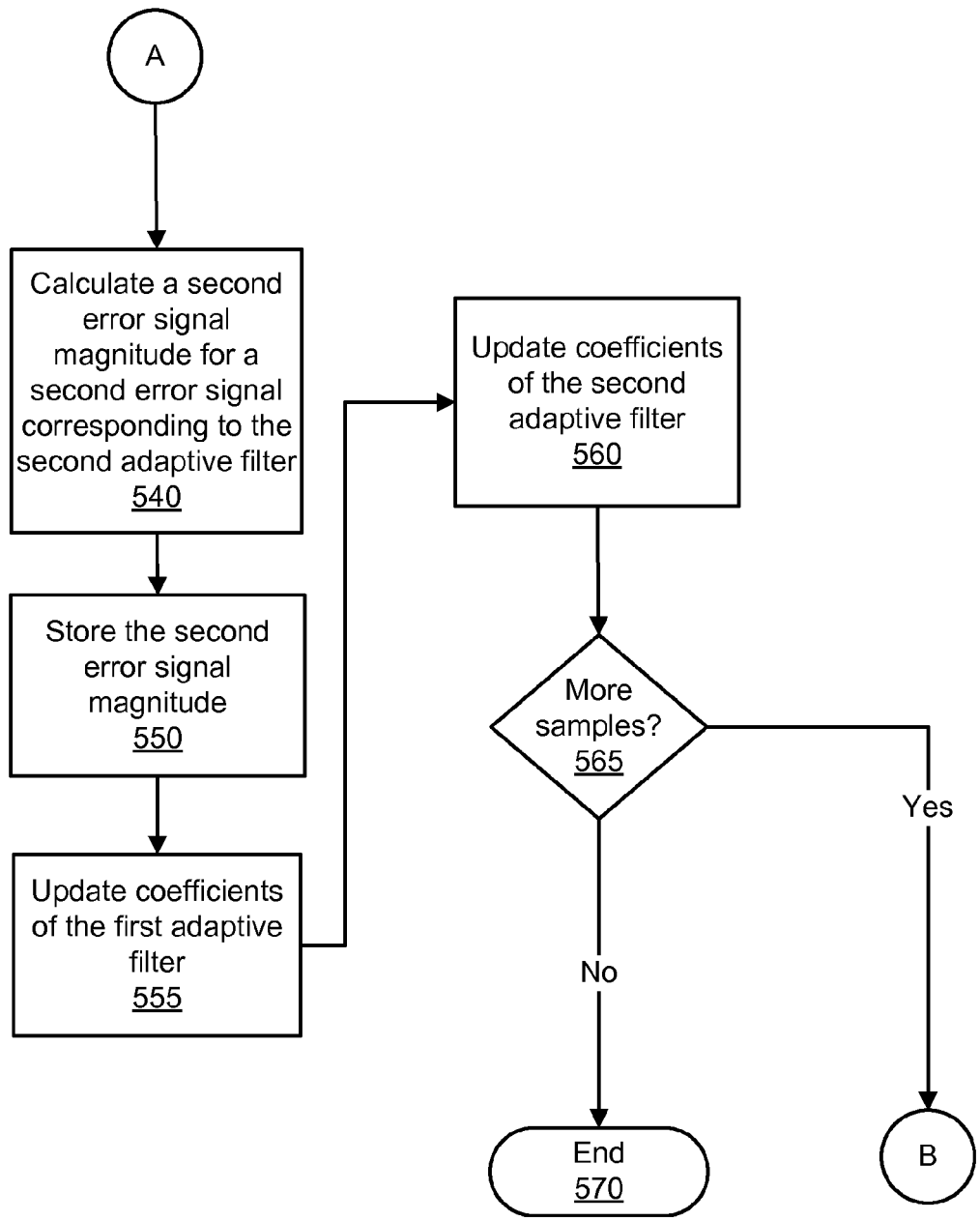

Turning now to FIGS. 5A and 5B, a method of reducing or cancelling one or more echoes is illustrated, according to various embodiments. At 505, ERS 10 can be initialized. For example, one or more coefficients of each of adaptive filters 120-132 can be initialized. For instance, the one or more coefficients of each of adaptive filters 120-132 can be initialized to zero. At 507, ERS 10 can receive a sample through $R_{in}$ port 113. In one or more embodiments, the sample can be provided to adaptive filter 120 and delay units 142-152 through receive signal 114. At 510, a minimum error magnitude of error magnitudes can be determined. For example, filter selector 196 can determine a minimum error magnitude from error magnitudes stored in memory locations 1980-1992. At 515, an error signal corresponding to the minimum error magnitude can be determined. For example, filter selector 196 can determine the error signal corresponding to the minimum error magnitude. In one or more embodiments, filter selector 196 can determine the error signal corresponding to the minimum error magnitude based on a memory location of the minimum error magnitude. For example, the error magnitudes stored in memory locations 1980-1992 can correspond to error signals 180-192, and by using the memory location or index, a corresponding error signal can be determined. At 520, the error signal corresponding to the minimum error magnitude can be output. For example, filter selector 196 can output the error signal corresponding to the minimum error magnitude as $S_{out}$ 118 (output of ERS 10).

At 522, a first adaptive filter corresponding to the minimum error signal magnitude can receive a first sample. In one example, the first adaptive filter may be adaptive filter 120, and the first adaptive filter can receive the first sample from receive signal 114. For instance, the first sample may be the sample received by ERS 10 at 507. In another example, the first adaptive filter may be adaptive filter 124, and the first adaptive filter can receive the first sample from delay unit 114. For instance, the first sample may be a sample received by ERS 10 in a previous iteration of the method illustrated in FIGS. 5A and 5B, since delay unit 124 can delay samples received by ERS 10 and provide samples received by ERS 10 to adaptive filter 124 after an amount of time transpiring. At 523, the first adaptive filter can process the first sample using its current coefficients and can output a first estimated echo replica. At 524, the first estimated echo replica can be combined with send signal 117 to produce a first error signal. For example, the first estimated echo replica may be estimated echo replica 104, and adder 164 can combine estimated echo replica 104 from its inverting input with send signal 117 from its non-inverting input to produce error signal 184.

At 525, a first error signal magnitude of a first error signal can be calculated. For example, filter selector 196 can calculate the first error signal magnitude of the first error signal. At 530, the first error magnitude can be stored. For example, filter selector 196 can store the first error signal magnitude of the first error signal in memory 198. For instance, filter selector 196 can store the first error signal magnitude at a memory location of memory locations 1980-1992. In one or more embodiments, error magnitudes can be stored in memory locations 1980-1992 that can correspond to error signals 180-192. For example, the first error magnitude can be stored at a memory location that corresponds to the first error signal.

At 535, a second least error signal magnitude can be determined, where the second least error signal magnitude is greater than the minimum error signal magnitude and less than the other error signal magnitudes. For example, filter selector 196 can determine a second least minimum error magnitude from error magnitudes stored in memory locations 1980-1992. At 537, a second adaptive filter corresponding to the second least error signal magnitude can receive a second sample. The second adaptive filter is different from the first adaptive filter. In one example, the second adaptive filter may be adaptive filter 120 (where the first adaptive filter may be one of adaptive filters 122-132), and the second adaptive filter can receive the second sample from receive signal 114. For instance, the second sample may be the sample received by ERS 10 at 507. In another example, the second adaptive filter may be adaptive filter 126 (where the first adaptive filter may be one of adaptive filters 120-124 and 128-132), and the second adaptive filter can receive the second sample from delay unit 116. For instance, the second sample may be a sample received by ERS 10 in a previous iteration of the method illustrated in FIGS. 5A and 5B, since delay unit 126 can delay samples received by ERS 10 and provide samples received by ERS 10 to adaptive filter 126 after an amount of time transpiring. At 538, the second adaptive filter can process the second sample using its current coefficients and can output a second estimated echo replica. At 539, the second estimated echo replica can be combined with send signal 117 to produce a second error signal. For example, the second estimated echo replica may be estimated echo replica 106, and adder 166 can combine estimated echo replica 106 from its inverting input with send signal 117 from its non-inverting input to produce error signal 186.

At 540, a second error signal magnitude of the second error signal can be calculated. For example, filter selector 196 can calculate the second error signal magnitude of the second error signal. At 550, the second error magnitude can be stored. For example, filter selector 196 can store the second error signal magnitude of the second error signal in memory 198. For instance, filter selector 196 can store the second error signal magnitude at a memory location of memory locations 1980-1992. For example, the second error magnitude can be stored at a memory location that corresponds to the second error signal.

At 555, coefficients can be updated of the first adaptive filter. At 560, coefficients can be updated of the second adaptive filter. For example, each of the first and second adaptive filters can be adapted, and coefficients of each of the first and second adaptive filters are updated so that a respective estimated echo replica converges with the echo signal in send signal 117. In one or more embodiments, each adaptive filter of the first and second adaptive filters can execute and/or implement a NLMS process to update the coefficients of the adaptive filter. At 565, a determination of whether or not additional samples are to be processed. If additional samples are to be processed, the method can process to 510. If no additional samples are to be processed, the method can conclude at 570.

In one or more embodiments, the method illustrated in FIGS. 5A and 5B may be executed with two of adaptive filters 120-132 performing a filter process. For example, filter selector 196 can provide one or more signals to adaptive filters 120-132 such that adaptive filters 124 and 130 process signal information while adaptive filters 120, 122, and 128-132 do not process signal information. For instance, adaptive filters 120, 122, and 128-132 can be paused. In one or more embodiments, a paused adaptive filter can maintain coefficients and/or does not continue to adapt.

In one or more embodiments, at least one of the first and second adaptive filters can be different for an additional iteration of the method illustrated in FIGS. 5A and 5B. For example, adaptive filters 124 and 130 process signal information while adaptive filters 120, 122, and 128-132 do not process signal information in an iteration. In one instance, for a subsequent iteration, adaptive filter 124 can be paused and adaptive filter 128 can continue processing signal information and/or adapting in the subsequent iteration. In another instance, for a subsequent iteration, adaptive filters 124 and 130 can be paused and filters 120 and 128 can continue processing signal information and/or adapting in the subsequent iteration. In one or more embodiments, adaptive filters 120-132 can be implemented with a processor executing instructions from a memory, and using two filters of adaptive filters 120-132 for each sample received by ERS 10 can reduce processing resources.

Figure 6A:
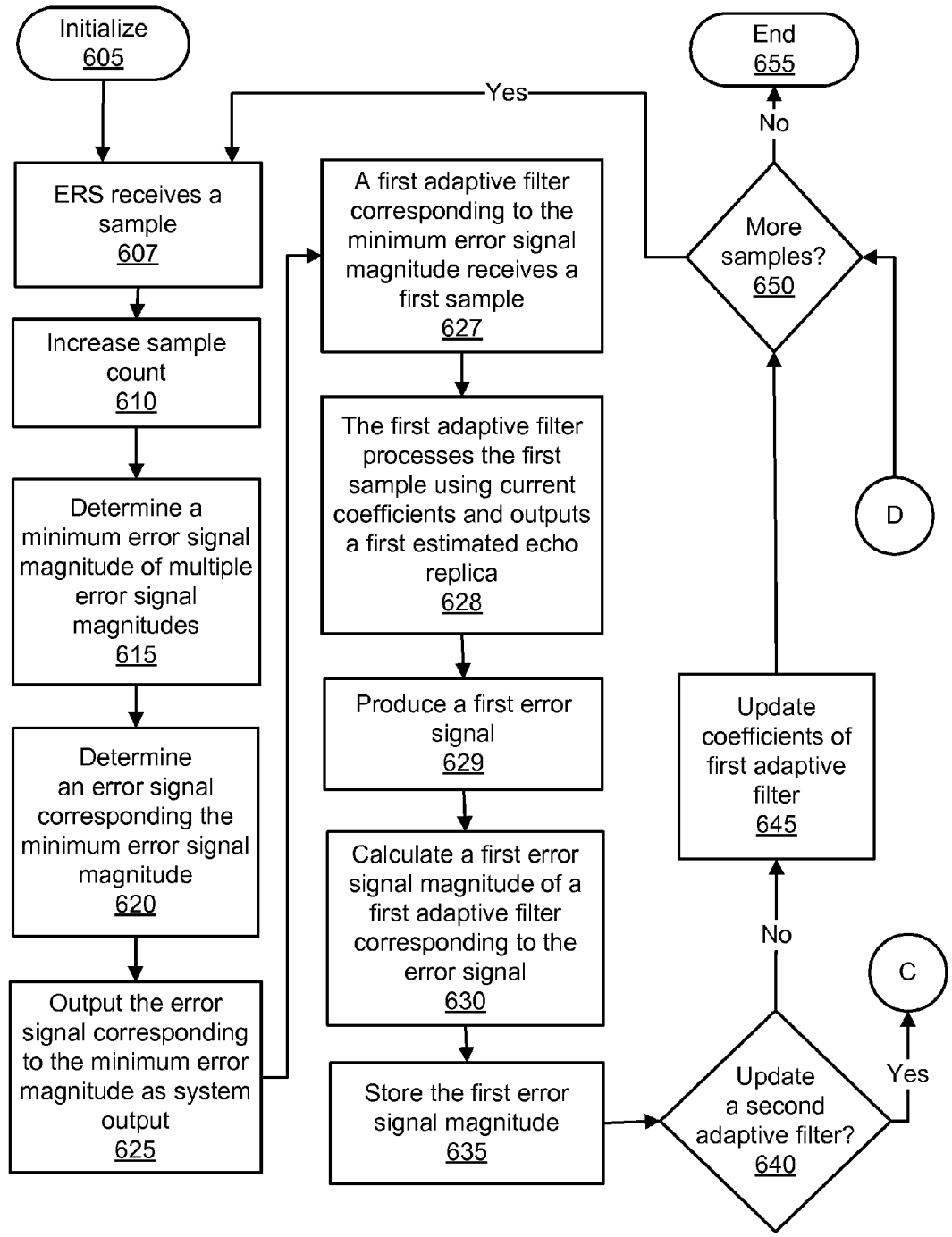
FIGS. 6A and 6B provide a flowchart diagram of a method, according to one or more embodiments.
Figure 6B:
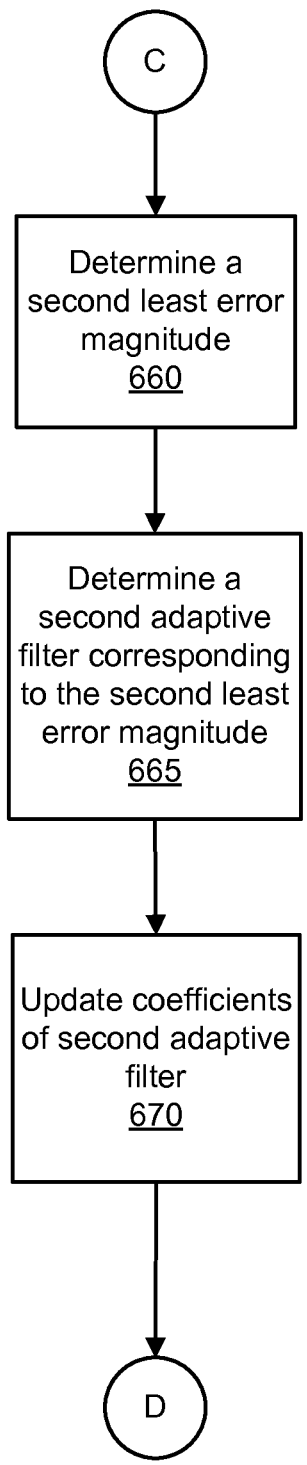

Turning now to FIGS. 6A and 6B, a method of reducing or cancelling one or more echoes is illustrated, according to various embodiments. At 605, ERS 10 can be initialized. For example, one or more coefficients of each of adaptive filters 120-132 can be initialized and/or a sample counter can be initialized. For instance, the one or more coefficients of each of adaptive filters 120-132 can be initialized to zero and/or a sample count of the sample counter can be initialized to zero. In one or more embodiments, a sample count can be referred to a sample index, and the sample count of the sample counter can be used to reference a current sample index or current sample count being processed. At 607, ERS 10 can receive a sample through $R_{in}$ port 113. In one or more embodiments, the sample can be provided to adaptive filter 120 and delay units 142-152 through receive signal 114. At 610, the sample count can be increased. For example, the sample count of the sample counter can be increased by one.

At 615, a minimum error magnitude of error magnitudes generated from adders 160-172 can be determined. For example, filter selector 196 can determine a minimum error magnitude from error magnitudes stored in memory locations 1980-1992. At 620, an error signal corresponding to the minimum error magnitude can be determined. For example, filter selector 196 can determine the error signal corresponding to the minimum error magnitude based on a memory location of the minimum error magnitude. For instance, the error magnitudes stored in memory locations 1980-1992 can correspond to error signals 180-192, respectively. At 625, the error signal corresponding to the minimum error magnitude can be output as $S_{out}$ 118 (output of ERS 10).

At 627, a first adaptive filter corresponding to the minimum error signal magnitude can receive a first sample. In one example, the first adaptive filter may be adaptive filter 120, and the first adaptive filter can receive the first sample from receive signal 114. For instance, the first sample may be the sample received by ERS 10 at 607. In another example, the first adaptive filter may be adaptive filter 124, and the first adaptive filter can receive the first sample from delay unit 114. For instance, the first sample may be a sample received by ERS 10 in a previous iteration of the method illustrated in FIGS. 6A and 6B, since delay unit 124 can delay samples received by ERS 10 and provide samples received by ERS 10 to adaptive filter 124 after an amount of time transpiring. At 628, the first adaptive filter can process the first sample using its current coefficients and can output a first estimated echo replica. At 629, the first estimated echo replica can be combined with send signal 117 to produce a first error signal. For example, the first estimated echo replica may be estimated echo replica 104, and adder 164 can combine estimated echo replica 104 from its inverting input with send signal 117 from its non-inverting input to produce error signal 184.

At 630, a first error signal magnitude of the first error signal can be calculated. For example, filter selector 196 can calculate the first error signal magnitude of the first error signal. For instance, the first error signal may be error signal 184, and filter selector 196 can calculate the first error signal magnitude from error signal 184. At 635, the first error magnitude can be stored. For example, filter selector 196 can store the first error signal magnitude of the first error signal in memory 198. For instance, filter selector 196 can store the first error signal magnitude at a memory location of memory locations 1980-1992. In one or more embodiments, error magnitudes can be stored in memory locations 1980-1992 that correspond to error signals 180-192, respectively.

At 640, a determination can be made whether or not to update a second adaptive filter. In one or more embodiments, the method of FIGS. 6A and 6B can use one adaptive filter of adaptive filters 120-132 to process a sample, and a second adaptive filter (different from the first adaptive filter) can be updated such that the second adaptive filter can process a sample with updated coefficients in a subsequent iteration. In one or more embodiments, the determination of whether or not to update the second adaptive filter can include a determination of whether or not the sample count of the sample counter is an integral multiple of N, where N is some predefined or predetermined non-zero positive integer. For example, if there exists some non-zero positive integer M, such that the sample count of the sample counter is equal to a multiplicative product of M and N (e.g., M×N), then the sample count is an integral multiple of N. In one or more embodiments, the determination of whether or not to update the second adaptive filter can include one or more other possible decision strategies and/or processes to determine whether or not to update the second adaptive filter.

If it is determined not to update the second adaptive filter, the method can proceed to 645. For example, if the sample count of the sample counter is not an integral multiple of N, the method can proceed to 645. At 645, coefficients of the first adaptive filter can be updated such that the first adaptive filter can process a sample with updated coefficients in a subsequent iteration. At 650, a determination of whether or not additional samples are to be processed by ERS 10. If additional samples are to be processed, the method can proceed to 610. If no additional samples are to be processed, the method can conclude at 655.

If it is determined to update the second adaptive filter, the method can proceed to 660. For example, if the sample count of the sample counter is an integral multiple of N, the method can proceed to 660. At 660, a second least error magnitude can be determined, where the second least error signal magnitude is greater than the minimum error signal magnitude and less than the other error signal magnitudes. For example, filter selector 196 can determine a second least minimum error magnitude from error magnitudes stored in memory locations 1980-1992. At 665, a second adaptive filter corresponding to the second least error magnitude can be determined. For example, filter selector 196 can determine the second adaptive filter, e.g., adaptive filter 132, corresponding to the second least error magnitude. In one or more embodiments, filter selector 196 can determine the second adaptive filter corresponding to the second least error magnitude based on a memory location of the second least error magnitude. For example, the error magnitudes stored in memory locations 1992 can correspond to error signal 192 and adaptive filters 132. At 670, coefficients of the second adaptive filter can be updated.

In one or more embodiments, each adaptive filter can pause and/or cease processing after processing a sample and not continue processing until a control signal, that indicates to continue processing, is received. For example, the first adaptive filter can pause itself, since the first adaptive filter has processed the first sample and the first adaptive filter does not receive a control signal that indicates that processing can continue. In one or more embodiments, signal processing in adaptive filters other than the first adaptive filter may be paused to this point in the method of FIGS. 6A and 6B. In one or more embodiments, the second adaptive filter can receive a control signal that indicates that processing can continue in a subsequent iteration, and the second adaptive filter can continue signal processing and process a next sample during that subsequent iteration. The method can proceed to 650.

In one or more embodiments, determining and/or identifying an adaptive filter of adaptive filters 120-132 can include determining and/or identifying an error signal that corresponds the adaptive filter. For example, adaptive filter 124 can be determined and/or identified from error signal 184. In one or more embodiments, memory locations (e.g., locations 1980-1992) can be used to map error signal magnitudes to error signals and/or to adaptive filters. For example, an error signal magnitude stored in location 1984 can be mapped to error signal 184 and/or adaptive filter 124. In one or more embodiments, various mappings can be used.

Turning now to FIG. 7, a block diagram of portions of a system for reducing or canceling echo signals is illustrated, according to one or more embodiments. In one or more embodiments, one or more structures and/or one or more methods described herein can be implemented with a processor executing instructions from a memory. As shown, a processing system 705 can include a processor 710 coupled to a memory 710 that includes instructions 715. In one or more embodiments, instructions 715 can be executed by processor 710 to implement one or more structures and/or one or more methods described herein. For example, ERS 10 can include processor 710 and memory 710 to implement one or more structures and/or one or more methods described herein. As illustrated, processing system 705 can be coupled to $S_{out}$ 118, $R_{in}$ 113, $R_{out}$ 115, linear system 194, and $S_{in}$ 116 which are described above.

In one or more embodiments, one or more systems and/or one or more portions of one or more systems described herein can include a memory, where a memory can include a memory medium and/or a computer readable storage medium. The term "memory medium" and/or "computer readable storage medium" can include various types of memory and/or storage. For example, memory medium and/or computer readable storage medium can include an installation medium, e.g., a CD-ROM, DVD-ROM, floppy disks, etc., a random access memory or computer system memory (volatile and/or non-volatile memory) such as DDR SDRAM, DRAM, SRAM, EDO RAM, NVRAM, EPROM, EEPROM, flash memory etc., and/or a non-volatile storage such as a magnetic media, e.g., a hard drive, and/or optical storage. In one or more embodiments, a memory medium and/or computer readable storage medium can include other types of memory and/or storage as well, or combinations thereof. In one or more embodiments, a memory medium and/or computer readable storage medium can be and/or include a product, e.g., a software product, and/or an article of manufacture that includes machine (e.g., processor) executable instructions that implement one or more portions of methods and/or processes described herein.

It is noted that, in one or more embodiments, one or more of the method elements described herein and/or one or more portions of an implementation of a method element may be performed in varying orders, may be performed concurrently with one or more of the other method elements and/or one or more portions of an implementation of a method element, or may be omitted. Additional method elements can be performed as desired. In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is noted that, in one or more embodiments, one or more of the method elements described herein and/or one or more portions of an implementation of a method element can be implemented using logic implemented in hardware (e.g., one or more integrated circuits). In one example, one or more of the method elements described herein and/or one or more portions of an implementation of a method element can be implemented using one or more state machines implemented using logic implemented in hardware. It is noted that, in one or more embodiments, one or more of the method elements and/or one or more portions of implementations of the one or more method elements described can be executed by a processing system such that one or more structures and/or one or more portions of the one or more structures of the system(s) described can be implemented. It is also noted that, in one or more embodiments, one or more of the system elements described herein can be omitted and additional system elements can be added as desired.

Further modifications and alternative embodiments of various aspects of the invention may be apparent to those skilled in the art in view of this description. Accordingly, this description is to be construed as illustrative only and is for the purpose of conveying those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. Unless stated otherwise, terms such as "first" and "second" are used to arbitrarily distinguish between the elements such terms describe. Thus, these terms are not necessarily intended to indicate temporal or other prioritization of such elements.

What is claimed is:

1. An echo canceller, comprising:
a plurality of adaptive filters, wherein each respective adaptive filter of the plurality of adaptive filters produces, in parallel, a respective estimated echo replica based on respective samples of a signal that are shifted in time for at least some of the adaptive filters;
a plurality of adders coupled to the plurality of adaptive filters, wherein each adder of the plurality of adders includes a first input coupled to a send signal and a second input coupled to an output of a respective adaptive filter of the plurality of adaptive filters, wherein each adder of the plurality of adders combines the inputs of the adder and produces an error signal based on the inputs of the adder on an output of the adder; and
a filter selector coupled to the outputs of the plurality of adders to receive the signals of the plurality of adders, wherein the filter selector calculates a plurality of error signal magnitudes using each received error signal, selects a minimum error signal magnitude from the plurality of error signal magnitudes, and outputs a first signal corresponding to the minimum error signal magnitude as a system output signal.

2. The echo canceller of claim 1,
wherein a first adaptive filter of the plurality of filter adapters receives a second sample, processes the second sample using the filter parameters of the first adaptive filter, produces a first estimated echo replica based on the second sample and the filter parameters of the first adaptive filter, and updates the filter parameters of the first adaptive filter;
wherein a respective adder coupled to the first adaptive filter produces a second error signal based on the first estimated echo replica; and
wherein the filter selector calculates a first error signal magnitude of the second error signal.

3. The echo canceller of claim 2,
wherein the filter selector determines a second least error signal magnitude;
wherein a second adaptive filter of the plurality of adaptive filters corresponding to the second least error signal magnitude receives a third sample, processes the third sample using the third sample and the filter parameters of the second adaptive filter, produces a second estimated echo replica based on the third sample and the filter parameters of the second adaptive filter, and updates the filter parameters of the second adaptive filter;
wherein a respective adder coupled to the second adaptive filter produces a third error signal based on the second estimated echo replica; and
wherein the filter selector calculates a second error signal magnitude of the third error signal.

4. The echo canceller of claim 3, further comprising:
a delay unit coupled to second adaptive filter, wherein the delay unit delays the third sample by an amount of time;
wherein the second adaptive filter receives the third sample after the amount of time transpires.

5. The echo canceller of claim 4, wherein the third sample is the second sample.

6. The echo canceller of claim 1,
wherein a first adaptive filter of the plurality of filter adapters receives a second sample, processes the second sample using the second sample and the filter parameters of the first adaptive filter, produces a first estimated echo replica based on the second sample and the filter parameters of the first adaptive filter, and updates the filter parameters of the first adaptive filter;
wherein a respective adder coupled to the first adaptive filter produces a second error signal based on the first estimated echo replica;
wherein the filter selector calculates a first error signal magnitude of the second error signal and determines whether the filter parameters of the first adaptive filter are to be updated or the filter parameters of the second adaptive filter are to be updated;
wherein the first filter adapter updates the filter parameters of the first adaptive filter, if the filter parameters of the first adaptive filter are to be updated; and
wherein the second filter adapter updates the filter parameters of the second adaptive filter, if the filter parameters of the second adaptive filter are to be updated.

7. The echo canceller of claim 1, further comprising:
a plurality of delay units coupled to at least two of the plurality of adaptive filters, wherein none of the plurality of delay units is coupled to at least one of the plurality of adaptive filters;
wherein each delay unit of the plurality of delay units receives a second sample and provides the second sample to a respective one of the adaptive filters after an amount of time associated with the delay unit transpires, wherein each amount of time associated with the delay unit is different from the amount of time associated with another delay unit; and
wherein the plurality of adaptive filters processes the second sample using filter parameters of the adaptive filter and produces a plurality of second estimated echo replicas, wherein each of the plurality of second estimated echo replicas is based on a respective adaptive filter of the plurality of adaptive filters processing the second sample using the filter parameters of the respective filter.

8. The echo canceller of claim 7,
wherein the plurality of adders produces a second plurality of error signals, wherein each of the second plurality of error signals is based on a respective one of the second plurality of second estimated echo replicas;
wherein the filter selector calculates at least a second error signal magnitude from one of the second plurality of error signals, updates the plurality of error signal magnitudes with the second error signal magnitude, determines a third error signal of the plurality of error signals that corresponds to the second minimum error signal magnitude, and outputs the third error signal as the system output signal, wherein the third error signal corresponds a second adaptive filter of the plurality of adaptive filters.

9. The echo canceller of claim 8, wherein the second adaptive filter is the first adaptive filter.

10. An echo canceller, comprising:
a processor; and
a memory coupled to the processor, wherein the memory includes instructions executable by the processor to:
implement a plurality of adaptive filters;
process, in parallel, first samples of a signal that are shifted in time with respect to each other using respective filter coefficients corresponding to each of the plurality of adaptive filters, wherein to process the first samples, the instructions are further executable by the processor to produce a first plurality of first estimated echo replicas that each correspond to a respective one of the plurality of adaptive filters;
determine a minimum error signal magnitude of a plurality of error signal magnitudes, wherein each of the plurality of error signal magnitudes is calculated from a respective one of a plurality of error signals, wherein each of the plurality of error signals is based on a respective one of the first plurality of first estimated echo replicas;
determine a first error signal of the plurality of error signals that corresponds to the minimum error signal magnitude, wherein the first error signal corresponds to a first adaptive filter of the plurality of adaptive filters; and
output the first error signal as a signal output.

11. The echo canceller of claim 10, wherein the instructions are further executable by the processor to:
receive a second sample;
process the second sample using the filter parameters of the first adaptive filter, wherein to process the second sample, the instructions are further executable by the processor to produce a second estimated echo replica based on the second sample and the filter parameters of the first adaptive filter;
produce a second error signal based on the second estimated echo replica;
calculate a first error signal magnitude of the second error signal; and
update the filter parameters of the first adaptive filter.

12. A method of operating an echo canceller, comprising:
processing, in parallel, first samples of a signal that are shifted in time with respect to each other using a plurality of adaptive filters of the echo canceller, wherein each adaptive filter of the plurality of adaptive filters processes the first samples using filter parameters of the adaptive filter, wherein the plurality of adaptive filters processing the first samples produces a first plurality of first estimated echo replicas, wherein each of the first plurality of first estimated echo replicas corresponds to a respective one of the plurality of adaptive filters;
calculating a plurality of error signal magnitudes from a plurality of error signals, wherein each of the plurality of error signals is based on a respective one of the first plurality of first estimated echo replicas;
determining a minimum error signal magnitude of the plurality of error signal magnitudes;
determining a first error signal of the plurality of error signals that corresponds to the minimum error signal magnitude, wherein the first error signal corresponds to a first adaptive filter of the plurality of adaptive filters; and
outputting the first error signal as a signal output.

13. The method of claim 12, further comprising:
the first adaptive filter receiving a second sample;
the first adaptive filter processing the second sample using the filter parameters of the first adaptive filter to produce a second estimated echo replica based on the second sample and the filter parameters of the first adaptive filter;
producing a second error signal based on the second estimated echo replica;
calculating a first error signal magnitude of the second error signal; and
updating the filter parameters of the first adaptive filter.

14. The method of claim 13, further comprising:
determining a second least error signal magnitude;
receiving a third sample at a second adaptive filter of the plurality of adaptive filters corresponding to the second least error signal magnitude;
processing the third sample at the second adaptive filter using the filter parameters of the second adaptive filter to produce a third estimated echo replica based on the third sample and the filter parameters of the second adaptive filter;
producing a third error signal based on the third estimated echo replica;
calculating a second error signal magnitude of the third error signal; and
updating the filter parameters of the second adaptive filter.

15. The method of claim 14, further comprising:
delaying the third sample by an amount of time;
wherein the second adaptive filter receives the third sample after the amount of time transpires.

16. The method of claim 15, wherein the third sample is the second sample.

17. The method of claim 12, further comprising:
receiving a second sample at the first adaptive filter;
processing the second sample at the first adaptive filter using the filter parameters of the first adaptive filter to produce a second estimated echo replica based on the second sample and the filter parameters of the first adaptive filter;
producing a second error signal based on the second estimated echo replica;
calculating a first error signal magnitude of the second error signal;
storing the first error signal magnitude; and
conditionally performing:
updating the filter parameters of the first adaptive filter; or
determining a second least error signal magnitude of the plurality of error signal magnitudes;
determining the second adaptive filter corresponds to the second least error signal magnitude; and
updating the filter parameters of the second adaptive filter.

18. The method of claim 12, further comprising:
receiving a second sample;
delaying the second sample to at least two adaptive filters of the plurality of adaptive filters, wherein said delaying the second sample includes delaying the second sample to one of the at least two adaptive filters by a first amount of time and delaying the second sample to another of the at least two adaptive filters by a second amount of time, wherein the second amount of time is different from the first amount of time; and processing the second sample.

19. The method of claim 18, wherein said processing the second sample includes each adaptive of the plurality of adaptive filters processing the second sample using filter parameters of the adaptive filter, wherein the plurality of adaptive filters processing the second sample produces a second plurality of second estimated echo replicas, wherein each of the second plurality of second estimated echo replicas corresponds to a respective one of the plurality of adaptive filters; the method further comprising:

producing a second plurality of error signals, wherein each of the second plurality of error signals is based on a respective one of the second plurality of second estimated echo replicas;

calculating at least a second error signal magnitude from one of the second plurality of error signals;

updating the plurality of error signal magnitudes with the second error signal magnitude;

determining a second minimum error signal magnitude of the plurality of error signal magnitudes;

determining a third error signal of the plurality of error signals that corresponds to the second minimum error signal magnitude, wherein the third error signal corresponds a second adaptive filter of the plurality of adaptive filters; and outputting the third error signal as the signal output.

20. The method of claim 19, wherein the second adaptive filter is the first adaptive filter.

21. The echo canceller of claim 1, wherein the plurality of adaptive filters includes more than two adaptive filters with each of the more than two adaptive filters processing the signal with a different delay.

* * * * *